March 15, 1960  A. DAUGUET  2,929,061
TRACKING SYSTEM
Filed April 16, 1956  5 Sheets-Sheet 1

INVENTOR.
ALEXANDRE DAUGET
BY
AGENT

INVENTOR.
ALEXANDRE DAUGET

March 15, 1960  A. DAUGET  2,929,061
TRACKING SYSTEM
Filed April 16, 1956  5 Sheets-Sheet 4
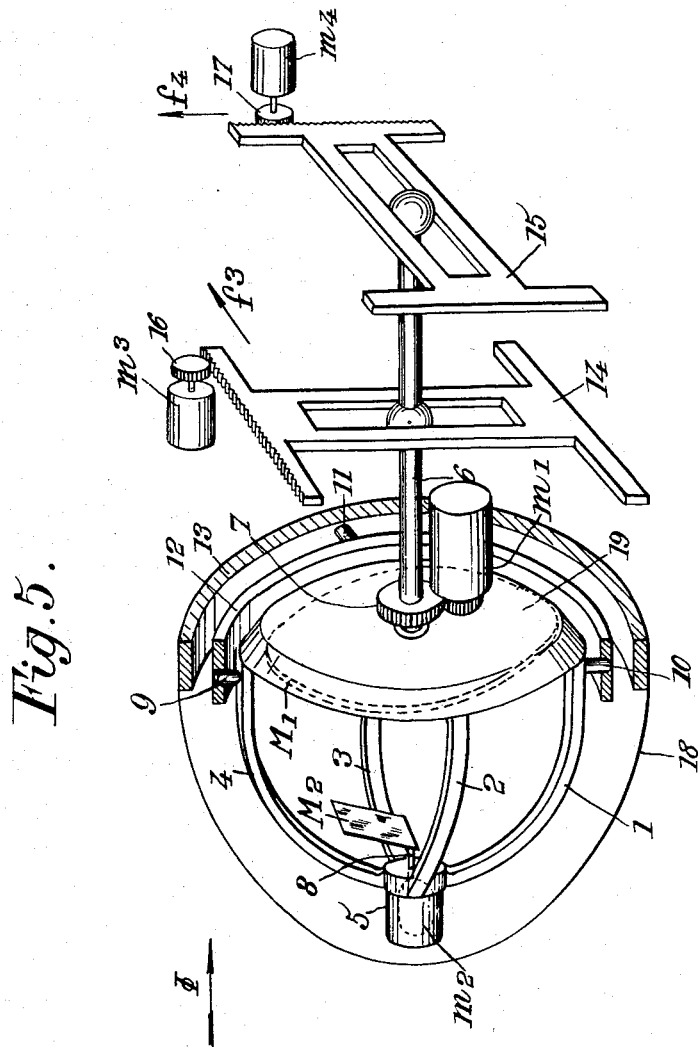
INVENTOR.
ALEXANDRE DAUGET
BY
AGENT March 15, 1960
A. DAUGUET
2,929,061
TRACKING SYSTEM
Filed April 16, 1956
5 Sheets-Sheet 5
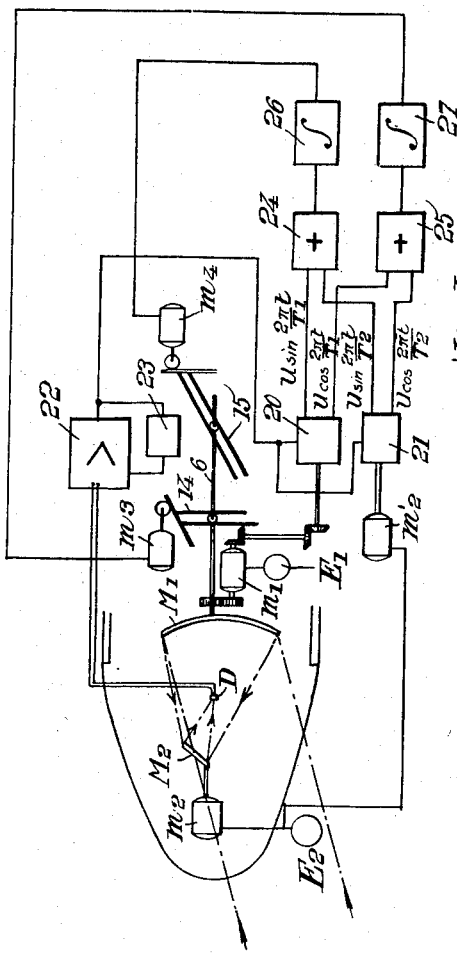
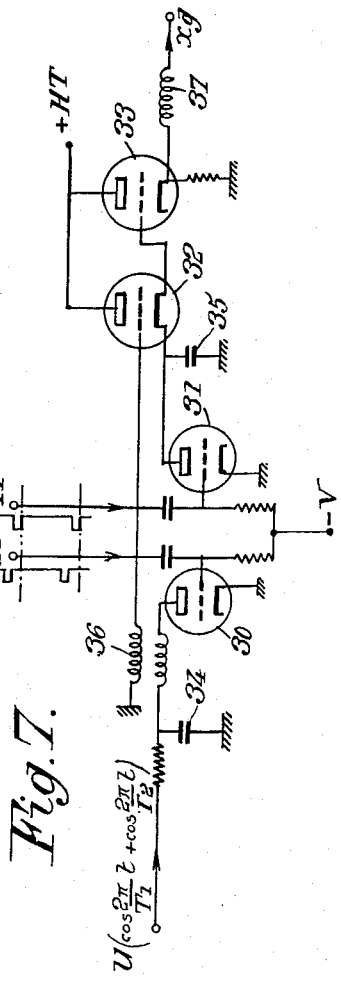
INVENTOR.
ALEXANDRE DAUGET
BY
AGENT

United States Patent Office 2,929,061
Patented Mar. 15, 1960

2,929,061

TRACKING SYSTEM

Alexandre Dauguet, Paris, France, assignor to Laboratoires d'Electronique et de Physique Appliquees L.E.P., Paris, France Application April 16, 1956, Serial No. 579,422

Claims priority, application France April 15, 1955

13 Claims. (Cl. 343—117)

The present invention relates to tracking systems wherein means for exploring space are associated with radiation-detectors, and serves to collect radiation energy from a predetermined part of space and to concentrate it onto an appropriate detector of the said radiation.

In most known means for exploring space, if the source of radiation which is to be found lies outside the field of the system employed and if this source is to be followed, it is necessary to take consequent steps to change the orientation of the said system.

A main object of the invention is to render the said systems such that they will satisfy the various practical requirements better than hitherto, and especially to make possible a detailed exploration of the part of space in question while ensuring the automatic following of the source of radiation in question, at least within a certain cone which may be called the "pursuit cone."

In a tracking system, containing a detecting arrangement furnished with means for detecting radiation and an automatic-following device adapted to aim the said system automatically on to a detected source of radiation, the invention consists mainly in that the exploring arrangement comprises a combination which collects radiation with rotating parts, adapted to ensure the exploration of a cone of space by combining two uniform rotary movements, one with an angular speed $\omega_1$ equal to $2\pi/T_1$ and the other with an angular speed $\omega_2$ equal to $2\pi/T_2$, in such a way as to collect the flux incident from the said cone on the detecting means which gives out a voltage $U(t)$ corresponding to the detected radiation, $t$ being the time measured from a suitable time origin, and in that the said detecting device is mounted on a support permitting of the displacement of the said exploring arrangement in two different directions in dependence upon control means, and in that the automatic following device embodies first calculating means which furnish voltages proportional to $$\sin \frac{2\pi t}{T_1}, \cos \frac{2\pi t}{T_1}, \sin \frac{2\pi t}{T_2} \text{ and } \cos \frac{2\pi t}{T_2}$$

so that second calculating means furnish, on the basis of the said voltages, two calculated voltages which are respectively proportional to $$\frac{\int U(t)\left[\cos \frac{2\pi t}{T_2} + \epsilon \cos \frac{2\pi t}{T_1}\right]dt}{\int U(t)dt}$$

and $$\frac{\int U(t)\left[\sin \frac{2\pi t}{T_2} + \epsilon \sin \frac{2\pi t}{T_1}\right]dt}{\int U(t)dt}$$

which are applied to the said control means in such a way as to displace the said exploring arrangement in a direction which tends to neutralize the said two calculated voltages, $\epsilon$ being equal to $+1$ or $-1$ according to the relative direction of rotation of the rotary apparatus and the integrations being taken over at least a time interval which is an integral multiple of the period of rotation $T_1$.

In addition to the principal arrangement it consists in various other arrangements which may be used separately or preferably simultaneously.

It envisages certain methods of carrying out and applying the invention (especially to the detection of sources of visible and invisible, ultra-violet luminous visible, infra-red, and long-wave hertzian radiation) and, as new manufactured products, the exploring or scanning systems, the arrangements for detection and automatic following, comprising applications of the above-mentioned arrangements, the components and special tools used for installing them, as well as the detector assemblies, whether fixed or movable, embodying similar systems and arrangements.

Without implying any restriction of the invention, the latter will now be more particularly explained with reference to the accompanying drawings, in which:

Figure 5 shows a schematic mechanical mounting of the head of a tracking system according to the invention;

Figure 6 is an electrical diagram of the lay-out of the said tracking system;

Figure 7 is a diagram of an integrating arrangement used in the said tracking system.

Before explaining the exemplary embodiment of the tracking system in question, we shall describe a first exploring arrangement which is that used in the said tracking system, it being supposed in the first instance, for the sake of simplicity, that the said arrangement remains stationary.

The object of the said first exploring arrangement, like that of the second exploring arrangement which will be described later, is to find all the sources of radiation situated in the interior of a cone of revolution with axis OX and a total vertical angle 2A (which may be called the "field" of the exploring arrangement in the stationary condition) by collecting the flux emitted by such sources and concentrating it on to means for detecting the appropriate radiation (for example a photo-electric cell) which may be considered as a point for convenience of explanation.

At a given instant $t$, there is focused on the said cell the energy coming from all the sources of radiation lying inside a cylinder of revolution $c$ with axis OI (the said cylinder being represented only by its axis). It is supposed for example that the axis OI of this cylinder is projected, in a rectangular cartesian co-ordinate system $oxyz$, into $Ix$ and $Iy$ respectively on the planes $yoz$ and $zox$, and the angle $2A$, in the interior of which the cylinder $c$ moves, is generally fairly small; the axis OI is sufficiently defined by the angles $x$ and $y$ which it makes with the projections $Ix$ and $Iy$.

The invention uses a scanning which is more or less of the hypocycloidal type, that is to say that the functions $x$ and $y$ are, in relation to the time $t$, of the form:

$$x(t) = \tfrac{1}{2}A\left[\cos(2\pi t/T_2) + \epsilon\cos(2\pi t/T_1)\right]$$
$$y(t) = \tfrac{1}{2}A\left[\sin(2\pi t/T_2) + \epsilon\sin(2\pi t/T_1)\right]$$

Figure 1:
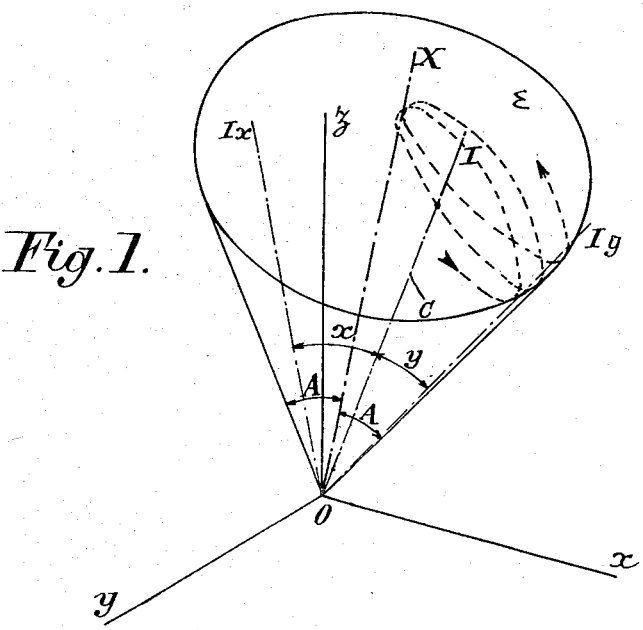
Figure 1 is a schematic diagram of the elementary cone of flux received by the exploring arrangement.

$T_2$ is a period of time smaller than $T_1$ and may be called the "interval of rapid analysis." During the time $T_2$ the direction OI of the picked-up energy makes one turn around an axis which itself, exhibiting a slower movement, makes one turn during the time $T_1$ (interval of slow analysis). In Figure 1 there is represented in part the trajectory described by the extremity of the unit vector of the said direction on its proper sphere $\epsilon$.

Figure 2:
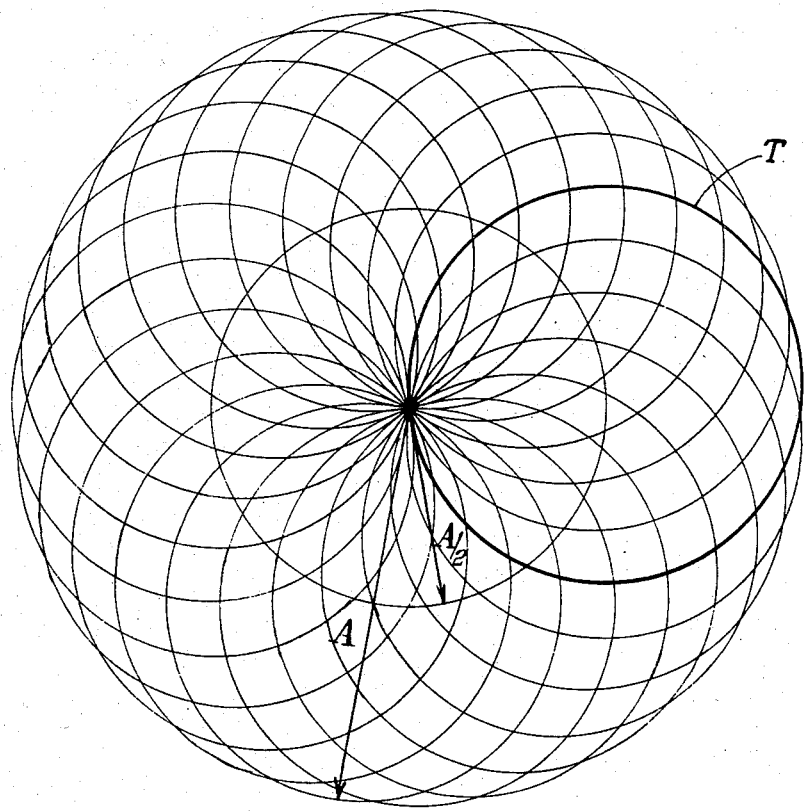
Figure 2 shows the corresponding movement of a detecting arrangement according to the invention.

Figure 2 gives, on a plane with cartesian co-ordinates, a conformal representation of this trajectory, which has the form of a rosette with multiple petals.

If $T_1$ and $T_2$ are such that:

$$p.T_1 = n.T_2$$

$n$ and $p$ being prime to one another, there is an interlacement of order $p$, that is to say that the complete period of scanning is equal to the least common multiple of $T_2$ and $T_1$, or $pT_1$, which $=nT_2$. The number of petals in the rosette is N, where $$N = p(T_1 + \epsilon T_2) = n + \epsilon p$$

Naturally $T_1$ and $T_2$ may bear any ratio to one another, and in this case the number of petals may be extremely large, or even infinite if the said ratio is equal to an irrational number.

To obtain a hypocycloidal scanning such as that indicated, we employ in a first example of an exploring arrangement according to the invention (refer to Figure 3 where the direction SJ of the incident energy is taken to be tangential to the field cone of the exploring arrangement): a first concave mirror M1 of relatively large diameter (to admit the greatest possible incident flux $\phi$ coming from sources to be found); the optic axis SX1 of this mirror, driven with a speed $\omega_1$ equal to $2\pi/T_1$ my the motor $m1$, describes a cone with a period $T_1$ around the general axis SX of the exploring arrangement, which is coincident with the axis OX of the field cone 2A; (the angle between these two axes is equal to $A/4$) a second convex mirror M2, of small diameter (so as to intercept only the small part of the flux $\phi$ received from the sources to be found) located opposite to the first mirror and adapted to form, on a detecting means D, the image of the virtual objects which may be formed by the mirror M1 in its focal plane, on the circle BB. This circle BB subtends an angle A at the point S. The mirror M2 is driven at a speed $\omega_2$ equal to $2\pi/T_2$ by a motor $m2$, for example through a plate P.

The arrangement of the invention here described, consisting in using two separate mirrors driven by separate motors, makes possible great freedom of space-scanning at the same time as the greatest possible precision of scanning.

In the movement of the mirror M2, the optical axis of the latter, passing through D, describes a cone with vertex D and having as its base the circle BB; its period is $T_2$. As a result the two mirrors M1 and M2 turn around a common axis which is SX.

The two mirrors may turn in the same sense (direct scanning, which gives the sign $+$ for $\epsilon$ in the above algebraic relations) or in opposite senses (inverse scanning which gives the sign $-$ for $\epsilon$ in the same relations).

The mirror M2, here convex, could also be replaced by a plane mirror (which would be situated half way between B and D) or by a concave mirror situated on the side of B opposite to D.

In any case, it is clear that the mirror M2 must be considerably smaller than the mirror M1 so that the mirror M1 may catch a portion of the flux which is considerable in comparison with that which is masked by the mirror M2. Besides, it is not necessary to provide diaphragms in the apparatus, the photo-sensitive cell D receiving only the flux captured by the reflecting surfaces of the mirrors.

This cell must obviously be sensitive to the spectral region of the radiation from the sources to be found, and it will be cooled if necessary.

Appropriate oscillators C1 and C2 generate voltages which have periods $T_1$ and $T_2$ respectively, and these voltages are applied to control means E1, E2 for the respective motors $m1$, $m2$. If it is desired to detect sources of radiation lying inside the field cone of the said exploring arrangement and to have at the same time a representation of the space explored, the voltages of the oscillators C1 and C2 are also applied to the deflecting means of a cathode-ray tube K. Current furnished by the cell D is amplified by an amplifier H so as to modulate the cathode beam of the tube K by energizing its control electrode. In this way there is obtained, in the explored space, a corresponding representation on the screen of the tube K.

By way of practical example we may take A equal to 16°. The frequency of the slow traverse may be F1, equal to $1/T_1$, which $=6$ periods per second, and the frequency of rapid analysis F2, equal to $1/T_2$, which $=50$ periods per second. The interlacement will be of the order 3, that is to say that a complete scanning period lasts half a second. The number of petals of the rosette will be $25 \pm 3$ which is equal to 22 or 28 according as the scanning is direct or opposite. The axis of the mirror M1 here describes a cone having a semi-vertical angle of 4°. Figure 2 has been drawn for this particular case.

Figure 3:
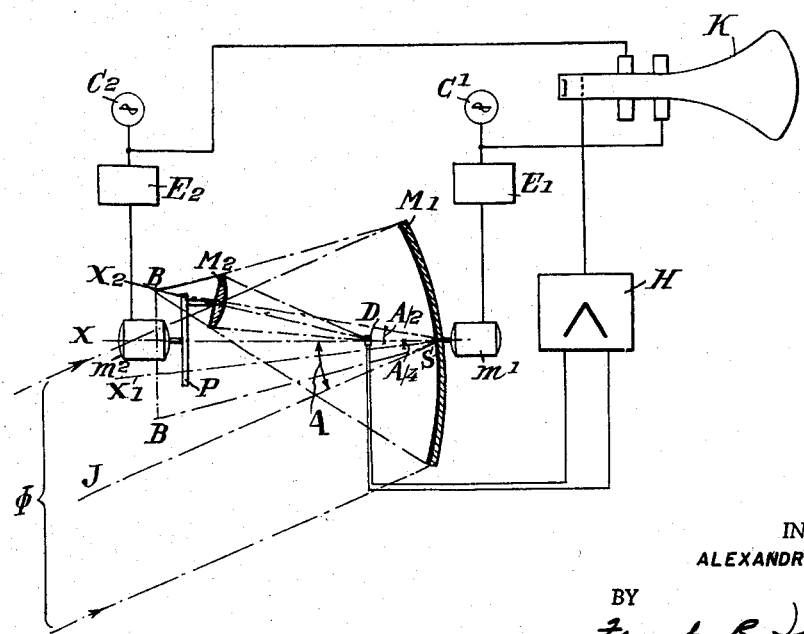
Figure 3 is a schematic diagram of an example of an embodiment of a first exploring arrangement according to the invention.
Figure 4:
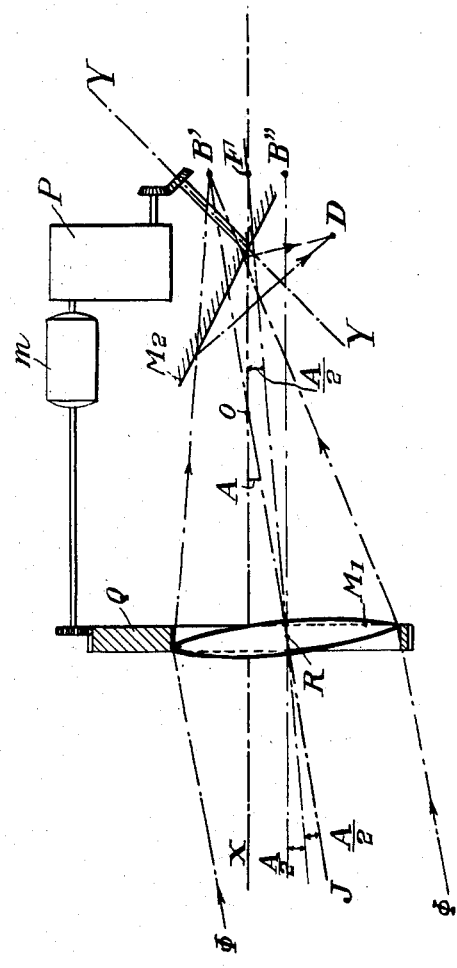
Figure 4 is a schematic diagram of an example of an embodiment of a second exploring arrangement according to the invention.

Figure 4 (where the components performing the same function as those in Figure 3 carry the same reference characters) represents a second example of an exploring arrangement according to the invention, comprising essentially a lens M1, preferably convergent, associated with a mirror M2 which is represented as being a plane mirror but could alternatively be convex or again concave. The detecting device D receives the incident flux $\Phi$ after refraction through M1 and reflection by M2. The lens M1, whose focus F is preferably located on the axis OX of the said second exploring arrangement, is driven with a uniform rotary movement of angular speed $\omega_1$ equal to $2\pi/T_1$ around this axis OX, which is also the axis SX shown in Figure 1. The lens M1, whose optic axis makes a certain angle with the axis OX, is driven by means of its crown wheel Q, having an external circular rack engaged with a pinion, by the motor $m$. This crown wheel Q is so designed as to form with the lens M1 a combination which can turn without wobble around the axis OX. The motor $m$ drives the mirror M2 through intermediate gearing and a variable-speed gear P, around an axis Y—Y with a uniform angular speed $\omega_2$ equal to $2\pi/T_2$. The axis Y—Y preferably makes an angle of 45° with the axis OX but makes an angle different from 90° with the plane of the mirhor M2, or an angle other than zero with the optical axis of this mirror if it is a concave mirror. As a result, in the course of one complete revolution of duration $T_2$, the mirror M2 conveys to the detecting means D an image B which is displaced along a curve whose traces in the plane of the figure are shown at B' and B''. To each of the points on this curve, which lies approximately in the focal plane of the lens M1, corresponds a certain direction of the incident flux $\Phi$, and the totality of the points on this curve corresponds a scanning of the space indicated for example by the heavy line T in Figure 2. When the two rotating parts M1 and M2 turn simultaneously, a space-scanning is obtained.

In order that the scanning may be analogous to that of Figure 2, the arrangement shown in Figure 4 is carried out in such a way that B'' shall lie on the line parallel to OX and passing through the optical centre R of M1. The distance from R to the axis OX must be considered to be zero in comparison with the distance of the sources of radiation to be detected. The optical axis RF of M1 preferably makes an angle equal to $\frac{1}{2}A$. As B' is sensibly symmetrical with B'' with reference to F, and B' and B'' are near this point F, the angles RB' and FRB'' are sensibly equal to $\frac{1}{2}A$ and the angle XOJ is equal to A. The field of the exploring arrangement shown in Figure 4 is equal to 2A.

If now it is desired to follow the source or sources of radiation in the event of its or their undergoing displacement, it is first of all indispensable that the exploring arrangement for the space under consideration shall be able to change its general orientation, the scanning which permits of a certain displacement being, in principle, very narrow.

Advantageously, in accordance with an arrangement which constitutes one feature of the invention, it is provided that the displacement of direction shall be effected in two different directions which obviously may conveniently be approximately perpendicular to one another and to the axis of the exploring arrangement (that is to say the common axis of the rotations of the two mirrors in the arrangement shown in Figure 3).

In accordance with the following description it will be understood that it would alternatively be possible, by following the same principles, to construct a system in which the two directions of displacement would make with one another or even with the general axis of the exploring arrangement, a certain angle different from 90°, without however departing from the ambit of the invention.

In order to construct an apparatus according to the invention which is capable of being displaced in its general orientation in two perpendicular directions of displacement which are perpendicular to one another and to the common axis, one may for example make use of a support with hinges or slides or equivalent means such as that represented somewhat schematically in Figure 5, where components corresponding to those shown in Figure 3 carry the same reference characters. In the following description we have chosen to use an exploring arrangement analogous to that of Figure 3, but it is obvious that we could have chosen an arrangement analogous to that of Figure 4 or any other exploring arrangement in accordance with the invention.

In fact, if the chosen exploring arrangement with its detecting means is suspended with a cardan joint, the axis of the said arrangement can freely take all the desired orientations without its weight interfering. The luminous or analogous flux $\Phi$ from the sources of radiation to be detected arrives on a first, concave, mirror M1 which concentrates it on a second, convex, mirror M2 which finally reflects it on to a detecting means D (not shown in Figure 5) located between M1 and M2. An assembly with four arms 1, 2, 3, 4 forming with a plate 19 a sort of cage supports a bearing 5 in which is mounted a motor $m2$ which drives the mirror M2 through a shaft 8 which can turn freely inside the said bearing. The mirror M1 can turn around its axis 6, which passes through the plate 19, thanks to a driving mechanism with a side motor $m1$ and a pinion driving the toothed wheel 7 which is integral with the shaft 6. The arms 1 and 4 are attached to the junctions of the cardan joint, whose articulations 9, 10, 11 and shells 12, 13 are shown (the last-mentioned being broken in the drawing for the sake of clearness).

To this assembly have been added two rectangular slides 14, 15 which make possible the desired displacements perpendicular to the axis. The corresponding movements are controlled by motors or servomotors $m3$, $m4$, for example through a rack engaging a toothed wheel 16, 17.

Let us suppose, for example, that we have to equip a mobile interception device, the contour of whose nose (transparent to the radiation to be detected), forming part of the exterior casing, is show at 18. The motors $m3$ and $m4$ are fixed on this casing, as is the shell 13 which can even, and preferably, form part of this casing, the latter being constituted, at least in part, by a tube.

In accordance with an arrangement which is a feature of the invention and is associated with the preceding arrangement, we provide an automatic-following arrangement, embodying automatic calculating means which are preferably electrical or electro-mechanical, for calculating the coordinates $xg$ and $yg$ of a loaded centre of gravity of the sources to be found, whatever be their nature and their brightness, with reference to the cartesian axes attached to the exploring arrangement itself; the quantities $xg$ and $yg$ are obtained in the form of voltages, called "error voltages," which are constantly applied to the corresponding motors $m3$, $m4$ in a sense which brings about displacements tending to neutralize these voltages.

To be more precise: let there be a certain number of sources of radiation distributed in the interior of the field of the apparatus covered by the scanning provided; the totality of these sources may show a continuous and/or discontinuous arrangement. In the course of the analysis the cell of the detecting means D generates a periodic signal whose total period, based upon a sufficient number $p$ of rotations at the slow speed of rotation $\omega_1$, is $pT_1$. Let $U(t)$ be this signal as a function of the time $t$; further it is known that sinusoidal and cosinusoidal voltages with the same periods can easily be derived from or linked with the rotations of the two mirrors M1 and M2 with periods $T_1$ and $T_2$. The calculating means of the invention have the function of calculating the expressions $Xg$ and $Yg$, where $$Xg = \frac{\int U(t)[\cos(2\pi t/T_2) + \epsilon \cos(2\pi t/T_1)]dt}{\int U(t)dt}$$

$$Yg = \frac{\int U(t)[\sin(2\pi t/T_2) + \epsilon \sin(2\pi t/T_1)]dt}{\int U(t)dt}$$

In these relations, which are analogous to those previously given for $x(t)$ and $y(t)$, $\epsilon$ is equal to $+1$ or $-1$ according to the relative direction of the rotations of the mirrors M1 and M2 (direct or opposite scanning as has already been indicated above) and the integrations are taken over a duration which is a multiple of $T_1$ (for example $pT_1$, equal to $nT_2$, in the case in which $T_1$ and $T_2$ bear a ratio which is a rational fraction).

In the calculation of $xg$ and $yg$ the sources act by means of the signal $U(t)$, by their brightness, and by a coefficient which is a function of their angular distance from the axis of the apparatus, which decreases rapidly as the source moves away from the axis. This coefficient, which is $n$ or $p$ $T_1/T_2$ times greater than at the centre of the field than at the periphery, is equal, for each point in the scanned space, to the number of times that each point is encountered in the course of a complete scanning.

The calculating means will therefore tend to take a greater account of the sources situated near the axis than of those which are remote from the axis.

If, in the particular case in which there is only one source, $xg$ and $yg$ are exact co-ordinates of that source, on the other hand, in the case where there are several sources, $xg$ and $yg$ are the co-ordinates of the point which will increasingly approach that source which is nearest to the axis in proportion as this axis approaches the source.

In the limit it is found that when the apparatus has seized upon one of the sources inside the initial field, the control of the axis must proceed upon the said source; only another, much brighter, source appearing in the field could then cause the head of the apparatus to deviate from the direction of the first-above-mentioned source.

It is known at the present time how to construct calculating means which make it possible to represent in the form of voltages the multiplications, additions, integrations, and divisions appearing in the formulae for $xg$ and $yg$ given above.

In any case, according to a preferred manner of carrying out the invention, the apparatus is associated with a device of the anti-fading type which keeps constant the expression $\int U(t)dt$, and this makes it unnecessary to divide by this expression in order to obtain $xg$ and $yg$.

The whole apparatus according to this method of carrying out this invention, comprising a space-exploring arrangement with detecting means, means for displacement in two perpendicular directions in accordance with Figure 5, and in addition an automatic-following device with calculating means, is shown schematically in Figure 6.

In order to obtain the above sine and cosine functions we may for example make use of two variometers 20 and 21 of the kind used in rotation-transmission (selsyn or other) apparatus whose axes rotate in synchronism with the mirrors M1 and M2. For example, the first variometer is driven by the motor $m1$ through transmission gearing, and the second by a motor $m'2$ fed in parallel and synchronized with the motor $m2$; the motors $m1$ and $m2$ are assumed to be controlled and regulated by the oscillator-governors E1, E2. The rotors of these variometers may present a certain phase-difference $\phi$, which amounts to showing the time origin for one of the variometers. The variometers are fed in parallel with the voltage furnished by the detector D, through an amplifier 22 provided with an anti-fading arangement 23 whose time-constant is related to the period $pT_1$.

The two stators of each of the variometers provide therefore respectively:

For the variometer 20, $U(\sin 2\pi t/T_1)$ and $$U(\cos 2\pi t/T_1)$$

For the variometer 21, $U \sin (2\pi t/T_2)$ and $$U \cos (2\pi t/T_2)$$

or $U \sin (2\pi t/T_2+\phi)$ and $U \cos (2\pi t/T_2+\phi)$.

It will be seen therefore that by arranging two adders 24, 25 and connecting them as indicated, then arranging for them to be followed by corresponding integrators 26, 27 we obtain, in the output of the latter, voltages proportional to $$\int U[\cos (2\pi t/T_2) + \cos (2\pi t/T_1)]dt$$

and $$\int U[\sin (2\pi t/T_2) + \sin (2\pi t/T_1)]dt$$

which are themselves respectively proportional to the expressions previously given for $xg$ and $yg$. These voltages, which are calculated once for all, are supplied to the corresponding motors $m3$, $m4$ in such a sense that the quantities proportional to $xg$ and $yg$ always tend to cancel themselves, the quantities $xg$ and $yg$ being zero when the axis of the apparatus is directed upon the source of detected radiation.

The components 24, 25 are subtractors in the case already indicated in which $\epsilon = -1$.

In the case in which an exploring arrangement analogous to that shown in Figure 4 is used, it is easily seen that it would suffice to arrange in suitable positions variometers 20 and 21, respectively driven at the angular speeds $\omega_1$ of the lens M1 and $\omega_2$ of the mirror M2, to obtain the desired voltages which would then be treated in the manner described in the remainder of the description relating to Figures 6 and 7.

The integration in the devices 26, 27 may be effected in various ways: in particular, a simple low-pass filter section may be sufficient if a very short response time is not required.

On the other hand it may be desired to effect the integration over a complete scanning period ($pT_1$, or the smallest common multiple of $T_1$ and $T_2$ when there is a fractional ratio between these two quantities) and to make use for this purpose of a clamping arrangement of the kind represented in Figure 7 (for the integrator 27), an analogous clamping arrangement being used as integrator 26.

Such an integrator embodies four triodes 30–33 mounted as shown in the figure. The voltage to be integrated continuously charges a condenser 34. The tubes 30 and 31 are normally biased to cut-off by a sufficient voltage $-V$ applied to their control girds; but the latter may receive short impulses I-1 and I-2 whose periodicity is that of the said complete scanning period. The impulse I-1 is each time applied first to the tube 31, with the result that the capacitor 35 is discharged; the impulse I-2 follows immediately after and, through the transformer 36, there is applied to the control grid of the tube 32 a voltage which assumes the value, at that moment, of the voltage across the terminals of 34. The values thus acquired are periodically applied to the control grid of tube 33, and the voltage corresponding to $xg$ can be taken from the cathode, preferably with the interposition of a self-inductance 37 for choking the oscillations.

In the case in which there are a large number of sources of radiation in the field of the apparatus, the orders furnished to the orienting motors $m3$, $m4$ make it possible, in a large number of cases, to orient the axis of the head of the rocket or analogous apparatus on to a single one of the said sources without any special selecting arrangement, which is certainly an advantage. In the self-guiding of a missile, sources other than the target aimed at are finally eliminated from the field in proportion as the missile approaches its target.

What I claim is:

1. A tracking system comprising a radiation detection assembly including a radiation detecting means and radiation collecting means positioned to direct received radiation to said detecting means, said radiation collecting means comprising two members adapted to be rotated cooperatively so as to explore a cone of space, means for rotating one of said members with an angular speed $\omega_1$ equal to $$\frac{2\pi}{T_1}$$

and means for rotating the other of said members with an angular speed $\omega_2$ equal to $$\frac{2\pi}{T_2}$$

$\omega_1$ being less than $\omega_2$ and $T_1$ and $T_2$ being the respective periods of rotation, whereby said detecting means produces a signal voltage $U(t)$ in response to any radiation detected within said cone of space, $t$ being the time measured from a time origin, a first calculating means for producing output voltages proportional to $$\sin \frac{2\pi t}{T_1}, \cos \frac{2\pi t}{T_1}, \sin \frac{2\pi t}{T_2} \text{ and } \cos \frac{2\pi t}{T_2}$$

a second calculating means connected to receive said signal voltage and said output voltages and adapted to produce two calculated voltages respectively proportional to $$\frac{\int U(t)\left[\cos \frac{2\pi t}{T_2} + \epsilon \cos \frac{2\pi t}{T_1}\right]dt}{\int U(t)dt}$$

and $$\frac{\int U(t)\left[\sin \frac{2\pi t}{T_2} + \epsilon \sin \frac{2\pi t}{T_1}\right]dt}{\int U(t)dt}$$

$\epsilon$ being equal to unity with a polarity sign depending upon the relative directions of rotation of said members and the integrations being taken over at least a time interval which is an integral multiple of the period of rotation $T_1$, and driving means connected to displace said radiation detection assembly in a direction such that the signal voltage $U(t)$ tends to neutralize said two calculated voltages, whereby said tracking system is automatically aimed at a detected source of radiation.

2. A tracking system comprising a radiation detection assembly including a radiation detecting means and radiation collecting means positioned to direct received radiation to said detecting means, said radiation collecting means comprising two members adapted to be rotated cooperatively so as to explore a cone of space, means for rotating one of said members with an angular speed $\omega_1$ equal to $$\frac{2\pi}{T_1}$$

and means for rotating the other of said members with an angular speed $\omega_2$ equal to $$\frac{2\pi}{T_2}$$

$\omega_1$ being less than $\omega_2$ and $T_1$ and $T_2$ being the respective periods of rotation, whereby said detecting means produces a signal voltage $U(t)$ in response to any radiation detected within said cone of space, $t$ being the time measured from a time origin, a first calculating means for producing output voltages proportional to $$\sin\frac{2\pi t}{T_1}, \cos\frac{2\pi t}{T_1}, \sin\frac{2\pi t}{T_2} \text{ and } \cos\frac{2\pi t}{T_2}$$

a second calculating means connected to receive said signal voltage and said output voltages and adapted to produce two calculated voltages respectively proportional to $$\frac{\int U(t)\left[\cos\frac{2\pi t}{T_2}+\epsilon\cos\frac{2\pi t}{T_1}\right]dt}{\int U(t)dt}$$

and $$\frac{\int U(t)\left[\sin\frac{2\pi t}{T_2}+\epsilon\sin\frac{2\pi t}{T_1}\right]dt}{\int U(t)dt}$$

$\epsilon$ being equal to unity with a polarity sign depending upon the relative directions of rotation of said members and the integrations being taken over at least a time interval which is an integral multiple of the period of rotation $T_1$, a Cardan joint mechanism connected to support said radiation detection assembly and permitting displacement of said radiation detection assembly in two mutually perpendicular directions, a pair of linearly sliding mechanisms coupled to said Cardan joint mechanism to accomplish said displacement in two mutually perpendicular directions, and a pair of driving means respectively connected to actuate said linearly sliding mechanisms in directions such that the signal voltage $U(t)$ tends to neutralize said two calculated voltages, whereby said tracking system is automatically aimed at a detected source of radiation.

3. A tracking system comprising a radiation detection assembly including a radiation detecting means and radiation collecting means positioned to direct received radiation to said detecting means, said radiation collecting means comprising two members adapted to be rotated cooperatively so as to explore a cone of space, means for rotating one of said members with an angular speed $\omega_1$ equal to $$\frac{2\pi}{T_1}$$

and means for rotating the other of said members with an angular speed $\omega_2$ equal to $$\frac{2\pi}{T_2}$$

$\omega_1$ being less than $\omega_2$ and $T_1$ and $T_2$ being the respective periods of rotation, whereby said detecting means produces a signal voltage $U(t)$ in response to any radiation detected within said cone of space, $t$ being the time measured from a time origin, a gain-controlled electronic amplifier connected to receive said signal voltage and adapted to keep proportional to U the integration $U(t)dt$ of the said signal voltage $U(t)$ during at least a time interval which is an integral multiple of the period of rotation $T_1$, a first calculating means connected to the output of said amplifier for producing output voltages proportional to $$\sin\frac{2\pi t}{T_1}, \cos\frac{2\pi t}{T_1}, \sin\frac{2\pi t}{T_2} \text{ and } \cos\frac{2\pi t}{T_2}$$

a second calculating means connected to the output of said first calculating means and adapted to produce two calculated voltages respectively proportional to $$\int U\left[\cos\frac{2\pi t}{T_2}+\epsilon\cos\frac{2\pi t}{T_1}\right]dt$$

and $$\int U\left[\sin\frac{2\pi t}{T_2}+\epsilon\sin\frac{2\pi t}{T_1}\right]dt$$

$\epsilon$ being equal to unity with a polarity sign depending upon the relative directions of rotation of said members, and driving means connected to displace said radiation detection assembly in a direction such that the signal voltage $U(t)$ tends to neutralize said two calculated voltages, whereby said tracking system is automatically aimed at a detected source of radiation.

4. A tracking system comprising a radiation detection assembly including a radiation detecting means and radiation collecting means positioned to direct received radiation to said detecting means, said radiation collecting means comprising two members adapted to be rotated cooperatively so as to explore a cone of space, means for rotating one of said members with an angular speed $\omega_1$ equal to $$\frac{2\pi}{T_1}$$

and means for rotating the other of said members with an angular speed $\omega_2$ equal to $$\frac{2\pi}{T_2}$$

$\omega_1$ being less than $\omega_2$ and $T_1$ and $T_2$ being the respective periods of rotation, whereby said detecting means produces a signal voltage $U(t)$ in response to any radiation detected within said cone of space, $t$ being the time measured from a time origin, a gain-controlled electronic amplifier connected to receive said signal voltage and adapted to keep proportional to U the integration $U(t)dt$ of the said signal voltage $U(t)$ during at least a time interval which is an integral multiple of the period of rotation $T_1$, a pair of variometers connected to be rotated in synchronism with said rotating members, respectively, and producing output voltages proportional to $$\sin\frac{2\pi t}{T_1}, \cos\frac{2\pi t}{T_1}, \sin\frac{2\pi t}{T_2} \text{ and } \cos\frac{2\pi t}{T_2}$$

a calculating means connected to the outputs of said variometers and adapted to produce two calculated voltages respectively proportional to $$\int U\left[\cos\frac{2\pi t}{T_2}+\epsilon\cos\frac{2\pi t}{T_1}\right]dt$$

and $$\int U\left[\sin\frac{2\pi t}{T_2}+\epsilon\sin\frac{2\pi t}{T_2}\right]dt$$

$\epsilon$ being equal to unity with a polarity sign depending upon the relative directions of rotation of said members, and driving means connected to displace said radiation detection assembly in a direction such that the signal voltage $U(t)$ tends to neutralize said two calculated voltages, whereby said tracking system is automatically aimed at a detected source of radiation.

5. A tracking system comprising a radiation detection assembly including a radiation detecting means and radiation collecting means positioned to direct received radiation to said detecting means, said radiation collecting means comprising two mirrors adapted to be rotated cooperatively so as to explore a cone of space, means for rotating a first one of said mirrors with an angular speed $\omega_1$ equal to $$\frac{2\pi}{T_1}$$

and means for rotating the second one of said mirrors with an angular speed $\omega_2$ equal to $$\frac{2\pi}{T_2}$$

$\omega_1$ being less than $\omega_2$ and $T_1$ and $T_2$ being the respective periods of rotation, whereby said detecting means produces a signal voltage $U(t)$ in response to any radiation detected within said cone of space, $t$ being the time measured from a time origin, said second mirror being positioned in front of the first mirror in the direction of received radiation and having an area substantially less than that of said first mirror so that the first mirror is able to receive relatively more of said radiation than is intercepted by said second mirror, a first calculating means for producing output voltages proportional to $$\sin \frac{2\pi t}{T_1}, \cos \frac{2\pi t}{T_1}, \sin \frac{2\pi t}{T_2} \text{ and } \cos \frac{2\pi t}{T_2}$$

a second calculating means connected to receive said signal voltage and said output voltages and adapted to produce two calculated voltages respectively proportional to $$\frac{\int U(t)\left[\cos \frac{2\pi t}{T_2} + \epsilon \cos \frac{2\pi t}{T_1}\right]dt}{\int U(t)dt}$$

and $$\frac{\int U(t)\left[\sin \frac{2\pi t}{T_2} + \epsilon \sin \frac{2\pi t}{T_1}\right]dt}{\int U(t)dt}$$

$\epsilon$ being equal to unity with a polarity sign depending upon the relative directions of rotation of said members and the integrations being taken over at least a time interval which is an integral multiple of the period of rotation $T_1$, and driving means connected to displace said radiation detection assembly in a direction such that the signal voltage $U(t)$ tends to neutralize said two calculated voltages, whereby said tracking system is automatically aimed at a detected source of radiation.

6. A tracking system as claimed in claim 5, in which said first mirror is a concave mirror, said first and second mirrors being arranged to rotate about a common axis.

7. A tracking system comprising a radiation detection assembly including a radiation detecting means and a radiation collecting means positioned to direct received radiation to said detecting means, said radiation collecting means comprising a lens and a mirror adapted to be rotated cooperatively so as to explore a cone of space, means for rotating said lens with an angular speed $\omega_1$ equal to $$\frac{2\pi}{T_1}$$

and means for rotating said mirror with an angular speed $\omega_2$ equal to $$\frac{2\pi}{T_2}$$

$\omega_1$ being less than $\omega_2$ and $T_1$ and $T_2$ being the respective periods of rotation, whereby said detecting means produces a signal voltage $U(t)$ in response to any radiation detected within said cone of space, $t$ being the time measured from a time origin, said lens being positioned in front of said mirror in the direction of received radiation, a first calculating means for producing output voltages proportional to $$\sin \frac{2\pi t}{T_1}, \cos \frac{2\pi t}{T_1}, \sin \frac{2\pi t}{T_2} \text{ and } \cos \frac{2\pi t}{T_2}$$

a second calculating means connected to receive said signal voltage and said output voltages and adapted to produce two calculated voltages respectively proportional to $$\frac{\int U(t)\left[\cos \frac{2\pi t}{T_2} + \epsilon \cos \frac{2\pi t}{T_1}\right]dt}{\int U(t)dt}$$

and $$\frac{\int U(t)\left[\sin \frac{2\pi t}{T_2} + \epsilon \sin \frac{2\pi t}{T_1}\right]dt}{\int U(t)dt}$$

being equal to unity with a polarity sign depending upon the relative directions of rotation of said members and the integrations being taken over at least a time interval which is an integral multiple of the period of rotation $T_1$, and driving means connected to displace said radiation detection assembly in a direction such that the signal voltage $U(t)$ tends to neutralize said two calculated voltages, whereby said tracking system is automatically aimed at a detected source of radiation.

8. A tracking system for exploring a cone of space to detect a target which emits radiation, comprising a radiation collecting means, means for rotating said collecting means with a constant angular velocity $\omega_1$ about a first axis coplanar with the optical axis of said collecting means, said collecting means having a focal plane on which is concentrated any radiant energy from the explored cone of space, reflecting means, means for rotating said reflecting means with a constant angular velocity $\omega_2$ on a circumference situated in said focal plane, $\omega_2$ being greater than $\omega_1$, radiation detecting means positioned to have concentrated thereon by said reflecting means the radiant energy collected on said circumference, means for producing azimuth and elevational error voltages corresponding respectively to any azimuth and elevation angular displacements between said first axis and the direction of said target, movable support means having mounted thereon said collecting means, said reflecting means and said detecting means, and a pair of servo motors connected to be responsive to said error voltages, respectively, said servo motors being coupled to said movable support means to actuate said movable support means in a direction for causing said tracking system to automatically aim said first axis onto said target.

9. A tracking system for exploring a cone of space to detect a target which emits radiation, comprising a concave mirror, means for rotating said mirror with a constant angular velocity $\omega_1$ about a first axis coplanar with the opitcal axis of said mirror, said mirror having a focal plane on which is concentrated any radiant energy from the explored cone of space, reflecting means, means for rotating said reflecting means with a constant angular velocity $\omega_2$ on a circumference situated in said focal plane, $\omega_2$ being greater than $\omega_1$, radiation detecting means positioned to have concentrated thereon by said reflecting means the radiant energy collected on said circumference, means for producing azimuth and elevational error voltages corresponding respectively to any azimuth and elevation angular displacements between said first axis and the direction of said target, movable support means having mounted thereon said concave mirror, said reflecting means and said detecting means, and a pair of servo motors connected to be responsive to said error voltages, respectively, said servo motors being coupled to said movable support means to actuate said movable support means in a direction for causing said tracking system to automatically aim said first axis onto said target.

10. A tracking system for exploring a cone of space to detect a target which emits radiation, comprising a lens, means for rotating said lens with a constant angular velocity $\omega_1$ about a first axis coplanar with the optical axis of said lens, said lens having a focal plane in which is concentrated any radiant energy from the explored cone of space, reflecting means, means for rotating said reflecting means with a constant angular velocity $\omega_2$ on a circumference situated in said focal plane, $\omega_2$ being greater than $\omega_1$, radiation detecting means positioned to have concentrated thereon by said reflecting means the radiant energy collected on said circumference, means for producing azimuth and elevational error voltages corresponding respectively to any azimuth and elevation angular displacements between said first axis and the direction of said target, movable support means having mounted thereon said lens, said reflecting means and said detecting means, and a pair of servo motors connected to be responsive to said error voltages, respectively, said servo motors being coupled to said movable support means to actuate said movable support means in a direction for causing said tracking system to automatically aim said first axis onto said target.

11. A tracking system for exploring a cone of space to detect a target which emits radiation, comprising a radiation collecting means, means for rotating said collecting means with a constant angular velocity $\omega_1$ about a first axis coplanar with the optical axis of said collecting means, said collecting means having a focal plane on which is concentrated any radiant energy from the explored cone of space, a convex mirror, means for rotating said mirror with a constant angular velocity $\omega_2$ on a circumference situated in said focal plane, $\omega_2$ being greater than $\omega_1$, radiation detecting means positioned to have concentrated thereon by said reflecting means the radiant energy collected on said circumference, means for producing azimuth and elevational error voltages corresponding respectively to any azimuth and elevation angular displacements between said first axis and the direction of said target, movable support means having mounted thereon said collecting means, said convex mirror and said detecting means, and a pair of servo motors connected to be responsive to said error voltages, respectively, said servo motors being coupled to said movable support means to actuate said movable support means in a direction for causing said tracking system to automatically aim said first axis onto said target.

12. A tracking system for exploring a cone of space to detect a target which emits radiation, comprising a radiation collecting means, means for rotating said collecting means with a constant angular velocity $\omega_1$ about a first axis coplanar with the optical axis of said collecting means, said collecting means having a focal plane on which is concentrated any radiant energy from the explored cone of space, a plane mirror, means for rotating said mirror with a constant angular velocity $\omega_2$ on a circumference situated in said focal plane, $\omega_2$ being greater than $\omega_1$, radiation detecting means positioned to have concentrated thereon by said reflecting means the radiant energy collected on said circumference, means for producing azimuth and elevational error voltages corresponding respectively to any azimuth and elevation angular displacements between said first axis and the direction of said target, movable support means having mounted thereon said collecting means, said plane mirror and said detecting means, and a pair of servo motors connected to be responsive to said error voltages, respectively, said servo motors being coupled to said movable support means to actuate said movable support means in a direction for causing said tracking system to automatically aim said first axis onto said target.

13. A tracking system for exploring a cone of space to detect a target which emits radiation, comprising a radiation collecting means, means for rotating said collecting means with a constant angular velocity $\omega_1$ about a first axis coplanar with the optical axis of said collecting means, said collecting means having a focal plane on which is concentrated any radiant energy from the explored cone of space, reflecting means, means for rotating said reflecting means with a constant angular velocity $\omega_2$ on a circumference situated in said focal plane, $\omega_2$ being greater than $\omega_1$, radiation detecting means positioned to have concentrated thereon by said reflecting means the radiant energy collected on said circumference, a first variometer connected to produce two output voltages measuring the angular rotation $\omega_1 t$, $t$ being the time measured from a time origin, a second variometer connected to produce two output voltages measuring the angular rotation $\omega_2 t$, means for combining the output voltages of said variometers with the output voltage of said radiation detecting means for producing an azimuth error voltage proportional to $$\frac{\int_0^\tau U(t) [\cos \omega_1 t + \epsilon \cos \omega_2 t]}{\int_0^\tau U(t)\,dt}$$

and an elevation error voltage proportional to $$\frac{\int_0^\tau U(t) [\sin \omega_1 t + \epsilon \sin \omega_2 t]}{\int_0^\tau U(t)\,dt}$$

where $\tau$ is determined by the equations $\omega_1 t = 2k_1\pi$, $\omega_2 t = 2k_2\pi$, $k_1$ and $k_2$ being whole numbers and $\epsilon$ being equal to unity with a polarity sign depending upon the relative directions of the rotations $\omega_1$ and $\omega_2$, movable support means having mounted thereon said collecting means, said reflecting means and said detecting means, and a pair of servo motors connected to be responsive to said error voltages, respectively, said servo motors being coupled to said movable support means to actuate said movable support means in a direction for causing said tracking system to automatically aim said first axis onto said target.

References Cited in the file of this patent

UNITED STATES PATENTS

| | | |
|---|---|---|
| 2,550,700 | Lancor | May 1, 1951 |
| 2,672,608 | Ringoen | Mar. 16, 1954 |
| 2,715,776 | Knowles | Aug. 23, 1955 |